United States Patent
Richter (10) Patent No.: US 9,539,840 B2
(45) Date of Patent: Jan. 10, 2017

(54) METHOD AND DEVICE FOR LASER MARKING WITH GREY LEVEL CALIBRATION

(71) Applicant: Bundesdruckerei GmbH, Berlin (DE)

(72) Inventor: Werner Richter, München (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 0 days.

(21) Appl. No.: 14/786,486

(22) PCT Filed: Apr. 17, 2014

(86) PCT No.: PCT/EP2014/057982
§ 371 (c)(1),
(2) Date: Oct. 22, 2015

(87) PCT Pub. No.: WO2014/173835
PCT Pub. Date: Oct. 30, 2014

(65) Prior Publication Data
US 2016/0067995 A1    Mar. 10, 2016

(30) Foreign Application Priority Data
Apr. 23, 2013  (DE) .......................... 10 2013 207 379

(51) Int. Cl.
*B41M 3/14*  (2006.01)
*B41M 5/26*  (2006.01)
(Continued)

(52) U.S. Cl.
CPC ................ *B41M 3/14* (2013.01); *B23K 26/03* (2013.01); *B23K 26/064* (2015.10); *B23K 26/08* (2013.01);
(Continued)

(58) Field of Classification Search
CPC ....... B23K 26/03; B23K 26/064; B23K 26/08; B23K 26/362; B23K 26/702; B41M 3/14; B41M 5/26
See application file for complete search history.

(56) References Cited

U.S. PATENT DOCUMENTS 6,252,196 B1    6/2001  Costin et al.
6,372,394 B1 *  4/2002  Zientek ................. B23K 26/18
                                                              283/85
(Continued)

FOREIGN PATENT DOCUMENTS

DE    102008025776 B4    5/2011
DE    102010010070 A1    9/2011
(Continued)

*Primary Examiner* — Alessandro Amari
*Assistant Examiner* — Roger W Pisha, II
(74) *Attorney, Agent, or Firm* — Frank J. Bongini, Jr.; John F. A. Earley, III; Harding, Earley, Follmer & Frailey, P.C.

(57) ABSTRACT

The invention provides a method and a device which enable laser markings to be performed and reduce the need of intervention by a service technician and still enable accurate grey scale markings to be performed reliably. Embodiments of the invention relate to a method and a device such that the device for laser marking is equipped with a measuring head which measures a laser output or laser pulse energy absolutely and using a measurement result thus obtained in order to change and suitably adapt an assignment function which assigns laser control values to grey scale values.

20 Claims, 2 Drawing Sheets

(51) Int. Cl.
*B23K 26/03* (2006.01)
*B23K 26/08* (2014.01)
*B23K 26/36* (2014.01)

(52) U.S. Cl.
CPC .......... *B23K 26/362* (2013.01); *B23K 26/702* (2015.10); *B41M 5/26* (2013.01)

(56) References Cited

U.S. PATENT DOCUMENTS

| | | | |
|---|---|---|---|
| 2009/0310470 A1* | 12/2009 | Yrjonen | B41M 3/14 369/116 |
| 2010/0258636 A1* | 10/2010 | Theodossiou | B41M 3/14 235/488 |
| 2012/0001413 A1 | 1/2012 | Pudleiner et al. | |

FOREIGN PATENT DOCUMENTS

| | | | |
|---|---|---|---|
| EP | 1527903 | A2 | 5/2002 |
| EP | 2181858 | A1 | 5/2010 |
| WO | WO2010089035 | A1 | 8/2010 |

\* cited by examiner

METHOD AND DEVICE FOR LASER MARKING WITH GREY LEVEL CALIBRATION

BACKGROUND OF THE INVENTION

1. Field of the Invention

The invention relates to a method for laser marking security documents and a corresponding device which enable the storage of graphic information, which describes a graphic having different brightness values, in a security document.

2. Brief Description of the Related Art

From prior art, it is known to mark security documents using laser radiation. In particular security documents, which are produced based on plastics, can be marked by means of laser radiation such that graphic information is stored on the surface of or inside the security document. To achieve storage inside a security document, pigments are for example added to a transparent material layer, which indeed promote absorption of laser radiation but do not at all or only insignificantly impair a general transparency of the material. The laser irradiation is absorbed locally in the layer provided with the pigments and this, for example, causes a carbonation of the plastic. Depending on the energy irradiated, different degrees of blackening, i.e. different grey scales, appear. The energy necessary for generating a certain grey scale is thus dependent on the security document to be marked.

For identically-made security document blanks, the energy quantity needed to induce a certain degree of blackening or a certain grey scale value is already known. In devices known from prior art, lasers are used which can be controlled, as regards their laser light output or a laser pulse energy, via a laser control signal. Preferably, pulsed lasers are used for laser marking, and the graphic information is composed of dots. Herein, all graphically representable information is viewed as graphic information. Thus, the graphic information can comprise an image, e.g. a facial image, a line drawing, text, numbers or similar, individually or in any combination. Particularly preferably, exactly one laser pulse is used for marking for each pixel which has a certain grey scale value. However, it is also possible to use several laser pulses of defined energy for generating one and the same pixel or to partially overlap several dots. However, the laser output or laser pulse energy can only be influenced relatively by such a laser control signal. This means that an accurate laser output or laser pulse energy cannot be accurately specified. Therefore, it is necessary to perform a calibration in the manner that, for each grey scale value which is to be marked, a calibration is performed in the manner that the laser control signal, i.e. the control value of the laser control signal, is varied until a marking with the corresponding grey scale value is achieved. Using the control values, thus ascertained, of the laser control signal, an assignment function can then be generated which assigns a corresponding control signal value to grey scale values to be marked, so that a corresponding laser pulse energy or laser pulse output for marking a pixel with the corresponding grey scale value is achieved. Since, due to thermal fluctuations and other environmental influences for the same control value of the laser control signal, the actually generated laser light output or laser pulse energy can vary slightly, it is known from prior art to decouple a part of the generated laser light onto a photodiode and to use the signal thereof, which is a measure for the captured laser output or pulse energy of the decoupled laser light, as a control signal for a control circuit, said control circuit effecting a correction of the laser control signal. While this makes it possible to use a calibrated device for laser marking over longer periods in order to obtain security documents having sufficient quality and reproducibility of the individual grey scale values, recalibration cycles are necessary at intervals, in which the actually generated grey scale values are compared to the grey scale values to be achieved. These calibrations can only be performed by specially trained technicians and/or require sophisticated optical measuring devices which can accurately compare the grey scale values to each other.

It should be noted here that the optically perceived grey scale value is usually determined by a plurality of pixels. On the one hand, the actual grey scale value of the individual pixels plays a role. Likewise, however, the perceivable grey scale value is also affected by a pixel density, i.e. a number of pixels per area. Usually, the individual pixels are each introduced into a document in a grid which is uniform for a graphic information. Of course, it is also possible to arrange the pixels at different distances to each other. When ascertaining or defining the grey scale values for the individual pixels for laser marking, the distances are known at which the pixels are formed in a document. The grey scale values for the individual pixels are defined accordingly. In the security document, in which the formed pixels can partially overlap each other, a graphic information then emerges which, for an observer, produces the desired grey scale impressions. However this assumes that not only the distances of the pixels but likewise the individual grey scale values of the individual pixels, which are formed by means of laser marking, are correct.

SUMMARY OF THE INVENTION

The invention is thus based on the technical task of creating a method and a device which enable laser markings to be performed and reduce the need of intervention by a service technician and still enable accurate grey scale markings to be performed reliably.

The invention is based on the idea of designing a method and a device such that the device for laser marking is equipped with a measuring head which measures a laser output or laser pulse energy absolutely and using a measurement result thus obtained in order to change and suitably adapt an assignment function which assigns laser control values to grey scale values.

PREFERRED EMBODIMENTS

A method for laser marking security documents is created, comprising the following steps:

a) capturing graphic information which describes a graphic having different brightness values;

b) generating a position control signal and a laser control signal dependent on the graphic information, wherein each brightness value is assigned a nominal laser light output or nominal laser pulse energy which is needed to induce a laser marking with the corresponding brightness value in a security document and, when generating the laser control signal by means of an assignment function, each brightness value is assigned a control value which is provided for generating laser light with the corresponding laser light output or laser pulse energy, c) controlling a laser by means of the laser control signal and emitting laser light with a laser light output or a laser pulse energy according to the laser control signal; and d) temporally adapted controlling of at least one position control device by means of the position control signal, so that the emitted laser light is positioned relative to the security document which is preferably arranged in a document receptacle, so that, by iteratively performing the method steps b) to d), a correctly positioned marking of the security document with the graphic having the different brightness values is performed, wherein at least one calibration step is performed, wherein, when performing the calibration step, the light control signal is generated with a control value for a brightness value and is held constant during the calibration step, a defined proportion of the laser light is decoupled from a beam path for the laser marking and guided into a measuring head measuring absolutely and an output of the decoupled proportion of the laser light, guided onto the measuring head, or the energy thereof, deposited in the measuring head, is measured absolutely, and, from the measured output or energy of the decoupled proportion of the laser light, the output or pulse energy available for marking is ascertained and the output ascertained is compared to the nominal laser light output or the pulse energy ascertained to the nominal laser pulse energy and the calibration is adapted by a change of the assignment function it in the comparison, a difference above a specified tolerance threshold is ascertained.

Furthermore, a device for laser marking is created, which comprises:

a) a control device with an interface for capturing graphic information which describes a graphic having different brightness values;

b) wherein the control device is designed to generate a position control signal and a laser control signal dependent on the graphic information; wherein each brightness value is assigned a nominal laser light output or nominal laser pulse energy which is needed to induce a laser marking with the corresponding brightness value in a security document and, by means of an assignment function, each brightness value is assigned a control value which is provided for generating laser light with the corresponding laser light output or laser pulse energy;

c) a laser, the laser light output whereof can be controlled by means of the laser control signal, emitting laser light with a laser light output or laser pulse energy according to the laser control signal;

and preferably d) a receptacle for receiving a security document to be marked and e) a beam guiding optics for guiding the laser light, emitted by the laser, onto the security document;

and f) at least one positioning control device controllable by means of the position control signal for positioning the laser light temporally adapted to the laser light output or laser pulse energy, defined by means of the laser control signal, relative to the security document, preferably received in the receptacle, so that a correctly positioned marking of the security document with the graphic having the different brightness values can be performed, wherein the device comprises a measuring head measuring absolutely and a decoupling unit for decoupling a defined proportion of the laser light from a beam path for laser marking and guiding the decoupled proportion onto the measuring head measuring absolutely, wherein the measuring head is designed to measure absolutely an output or energy of the decoupled proportion of the laser light guided onto the measuring head and to output a calibration signal representing the absolutely measured light output or deposited energy, wherein the control device is designed to capture and evaluate the calibration signal representing a captured laser light output or energy, wherein the control device is further designed to perform, during operation of the device, at least one calibration step in which the laser control signal is generated for a brightness value and held constant during the calibration step, to ascertain, from the measured laser light output or laser pulse energy of the decoupled proportion of the laser light, the output or pulse energy available for marking and to compare the output ascertained to the nominal laser light output or the pulse energy ascertained to the nominal laser pulse energy, and effects the calibration by a change of the assignment function if, in the comparison, a difference above a specified tolerance threshold is ascertained.

The advantage of the invention is that a calibration of the device for laser marking can be performed without this requiring a specially trained person. This is of particular advantage especially for decentrally used laser marking devices. If the control unit of the device is designed such that it can receive an assignment function or one of different assignment functions can be selected for different marking operations, then it is further possible to mark different document blanks with one and the same device and to perform calibrations for this. This is especially advantageous if novel document blanks are to be used, for which it is only required to provide an assignment function adapted to the document blank, in order to mark any grey scale graphics in the document blank with consistent grey scale graphics each having absolute grey values. Adapted to the special document blank or a marking plane selected therefor, only the corresponding assignment function must be provided, received and/or selected in order to enable reliable marking.

In a preferred embodiment of the invention, it is intended that the measuring head measuring absolutely comprises a thermopile. A thermopile consists of a thermocouple or of several thermocouples thermally connected in parallel and electrically connected in series, wherein always one connection point of the thermocouple is subjected to radiation and the other one is protected from the radiation. With a once-calibrated thermopile, a deposited radiation output can be determined reliably and absolutely. Such accuracy cannot, for example, be achieved by means of photodiodes or other currently known semiconductor components since their measurement values, in particular, heavily depend on the ambient conditions, and vary.

A preferred method thus envisages that an output of the laser light is measured by means of a measuring head comprising a thermopile.

The minimal fluctuations, which may occur during a marking operation, of the actually generated laser output or laser pulse energy for the different laser control signal values, which occur during a marking operation, it is intended in an embodiment of the invention that, additionally, there is a further output measuring device or laser pulse energy measuring device which performs a relative output or laser pulse energy measurement. It is preferably formed by means of a semiconductor component, especially a light-sensitive diode. The captured relative output fluctuations or pulse energy fluctuations can be used analogously to the ascertained absolute output values/pulse energy values in order to effect, between two calibration steps for certain brightness values, a short-term adaptation of the assignment function.

In a preferred embodiment of the invention, it is thus intended that, after marking a predefined number of security documents, a calibration step for at least one brightness value is performed. In an embodiment of the invention, between the marking of two security documents, a calibration step for only one brightness value is performed. In another embodiment, it is intended that successive calibration steps are performed for different brightness values, provided that no adaptation of the calibration is necessary. It is understood that, at the beginning of a commissioning of a laser marking device, a calibration each shall be performed for all desired brightness values. In continuous operation, however, only individual calibration steps are then necessary for individual brightness values in order to check the calibration and to save time. If time is not a limiting factor, the full calibration should always be performed.

Usually, after performing of a calibration step for a brightness value, in which a change of the assignment function was performed, a required change of the assignment function for other brightness values can be extrapolated. If such an extrapolation is performed, then, when performing a subsequent calibration step for one of these other brightness values, it is possible to achieve that the calibration step necessitates no further change of the assignment function. If the calibration is performed such that, for each brightness value for which a calibration is performed, calibration steps are performed until adaptation of the assignment function in the context of a specified tolerance is no longer necessary, then such an extrapolation often leads to a clear acceleration of a calibration, in which several brightness values calibrated as soon as an adaptation of the assignment function was necessary for a brightness value. During the calibration on the occasion of the commissioning, too, an extrapolation leads to an acceleration of the entire calibration.

In an embodiment, it is intended that a calibration step for the same brightness value is directly repeated if an adaptation of the calibration is necessary by changing the assignment function. Thus, in this embodiment, a further calibration step for the same brightness value is performed, provided that, in the previously performed calibration step, a change of the assignment function was necessary.

If only one calibration step is performed between the marking of security documents, it is intended in one embodiment that the selected brightness value is varied cyclically. Thus, after a predefined number of security documents, each occurring brightness value is always subjected to a calibration check or calibration.

In another embodiment, it is intended that the brightness value is always ascertained stochastically. Any occurring long-term drifts, which have a cyclic fluctuation, cannot, in this method, adversely affect the calibration or be traced better.

In a preferred embodiment, during a calibration step in ascertaining the laser light output or laser pulse energy, several laser pulses are guided onto the measuring head measuring absolutely and an averaging is performed over several laser pulses. Such an averaging is especially useful if the measuring head measuring absolutely has a measurement inertia which is greater than a repetition rate of the laser used. If the measuring head measuring absolutely can perform measurements with a measurement frequency of 20 kHz and if a laser is used which has a repetition frequency of 100 kHz, then such an averaging is useful. Otherwise, the use of a laser pulse selection device would be necessary which, for example, only directs every fifth laser pulse onto the measuring head or allows it to pass to it. For example, a closing cap, a controllable aperture or an aperture wheel could be used for this.

BRIEF DESCRIPTION OF THE DRAWING FIGURES

Below, the invention is explained in more detail by reference to a drawing, with.

DETAILED DESCRIPTION OF THE INVENTION

Figure 1:
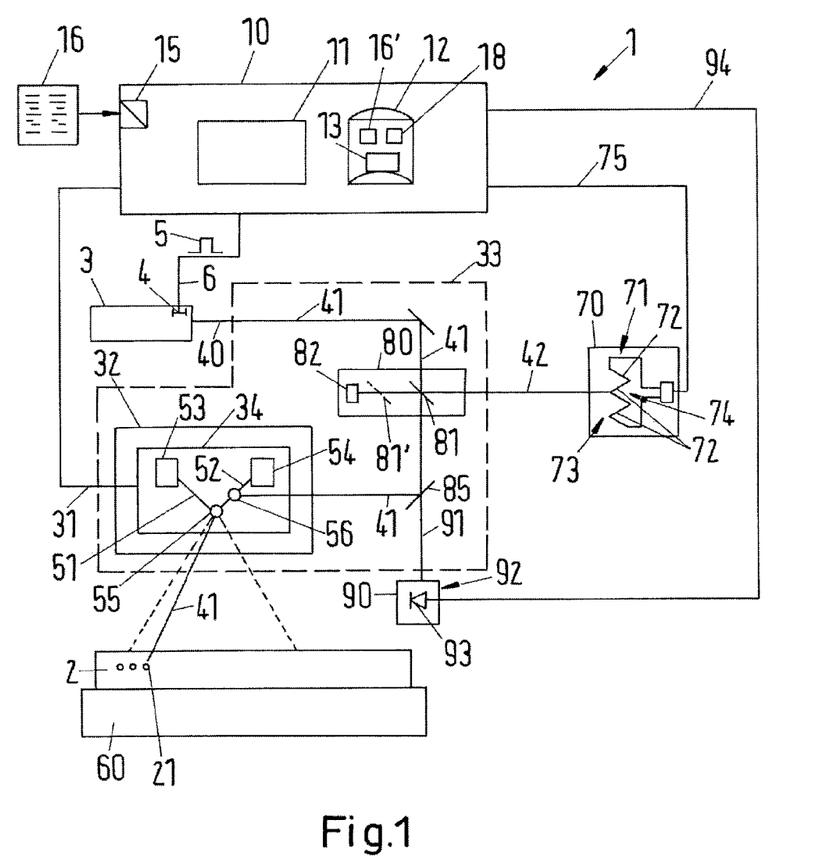
FIG. 1 showing a schematic representation of a device for laser marking.

FIG. 1 schematically shows a device 1 for laser marking a security document 2. Relative sizes of the components described do not correspond to the real circumstances. The device 1 comprises a laser 3 which is preferably designed as a pulse laser. The laser 3 has a control input 4 via which a laser control signal 5 can be received, by means of which a laser light output or a pulse energy can be controlled.

The laser control signal 5 is generated by a control device 10. It preferably comprises a microprocessor 11 and a memory unit 12 in which program code 13 is deposited, which can be executed on the microprocessor 11. Through cooperation of the microprocessor 11, the memory unit 12 and the program code 13 there results, in the execution thereof, the functionality of the control device 10. It is designed to be able, via an interface 15, to capture information 16 which describes a graphic, having different brightness values, to be marked into the security document 2. The control unit can be designed as a personal computer (PC). Alternatively, the control unit can, however, also be designed as a plug-in card for a computer or as a stand-alone unit.

Each two- or three-dimensional position of the graphic thus is assigned a brightness value or grey scale value. The graphic information, for example, is designed as a tuple, always comprising location coordinates for a position of a marking and a brightness or grey scale value for this marking. Preferably, the received graphic information 16' is temporarily stored in the memory unit 12. Each brightness value is, for a certain document blank or security document 2, assigned a certain laser light output or laser pulse energy which is needed to mark the corresponding brightness value in the security document 2. A connection between the brightness values and the required laser outputs/pulse energies is already known but, usually, cannot be represented via a linear function. Nonetheless, there exists an assignment function 18 which assigns a laser light output or laser pulse energy to the brightness values.

This assignment function 18 or the parametrisation thereof is also deposited in the memory unit 12, in the embodiment shown. In other embodiments, the assignment function can be integrated into the program code 13.

In yet other embodiments, the assignment function 18 can be provided together with the graphic information 16 or separately transmitted to the control device 10 and for example received via the interface 15. This is advantageous if different types of security documents 2 or security documents blanks are to be marked, which have a different material composition, so that the required (nominal) laser light output or (nominal) laser pulse energy for achieving a certain brightness value for the different security documents blanks is different.

The connection between a brightness value and the laser pulse energy needed to form this brightness value is ascertained during the document development. For this, in a document of a corresponding document type, pixels are marked with constant laser pulse energy in a specified grid. The resulting grey scale value or brightness value is ascertained by means of a measuring device, for example a densitometer. Thus, for the specified grid, an assignment of brightness value and laser pulse energy is ascertained by iteratively performing the method for different laser pulse energies. Due to the knowledge of the grid, the brightness of an individual pixel for a certain laser pulse energy can be inferred. If markings are performed with different pixel distances, this entire method can also be performed for several grids. Depending on the grid (pixel distance) used, different laser pulse energies are required for generating a two-dimensional document section which causes a specified homogeneous brightness impression (grey scale value) and is always formed by means of pixels generated with the same energy. Broadly speaking, the coarser the grid (the greater the point distances), the greater the laser pulse energy of the individual similar laser pulses must be in order to generate the same colour impression of a two-dimensional region. All of these considerations, however, are important to generating the graphic information. During marking, the control device thus selects, depending on the grid used, the laser pulse energy needed using the assignment function for this grid. If a document is marked with pixels, which are applied in different grids, then the assignment function can be regarded as a function of two variables. The laser pulse energy for a specified brightness value then also still depends on the pixel increment. The pixel increment, however, can also be regarded as a flock parameter of a flock of assignment functions. This observation should come closest to the practical application. Irrespective of which specific design is chosen, an assignment takes place, in the control unit, between a brightness value of the graphic information and a control value for generating a specified laser pulse energy. This assignment function is adapted by the method according to the invention, during calibration.

To perform a marking of the graphic information in the security document 2, i.e. to form the graphic, contained in the graphic information 16, in the security document 2, the control device 10 generates, using the graphic information 16, a position control signal 31 and a laser control signal 5. The laser control signal 5 is guided by means of a control line 6 to the control input 4 of the laser 3 and thus the laser light output or pulse energy of the generated and emitted laser light 40 is controlled.

A position control device 32 is controlled via the position control signal 31. In the embodiment represented, said position control device is a component part of a beam guiding optics 33, which guides the laser light 40, generated by the laser 3, onto the security document 2. The position control device 32 which, for example, can be a two-axis deflection device 34, in turn comprises two axes 51, 52 substantially oriented perpendicularly to each other and pivotable deflection mirrors 55, 56 provided with a galvano drive 53, 54. The position control signal 31 is or will be generated, temporally correlated to or synchronised with the laser control signal 5 and supplied to the laser 3 or the position control device 32, such that the laser light 40 is irradiated with the laser light output or laser pulse energy, assigned to a desired brightness value, onto the corresponding location on or in the security document, said location matching the position of the corresponding brightness values according to the graphic information. Successively or iteratively, the graphic stored in the graphic information 16 is thus marked in the security document 2 via laser markings 21, which is received in a holder or document receptacle 60.

While the laser light output or laser pulse energy needed to form a certain grey scale value is accurately known for a certain security document type or a type of security document blank, neglecting possibly occurring production variations of the security documents or security document blank, the laser light output of the laser light 40, actually provided by the laser 3, or the laser pulse energy thereof cannot be accurately predicted. This has different causes, for example aging effects of electronic components within the laser 3, optical adjustment settings in the laser 3, aging phenomena of the laser medium or of the optical pump device, contamination on elements for beam guidance of the laser light 40 (lenses, mirrors etc.) etc. influence the actually provided laser light output or laser pulse energy for a certain control value applied to the control input 4. It is therefore necessary, prior to initial commissioning, during commissioning after a longer stoppage and also from time to time during operation, to perform a calibration to ensure that the marking in the security document, generated by the laser light, has the brightness value intended according to the graphic information.

A measurement of the laser pulse energy is performed in the beam guidance as close as possible to the actual marking location. This means that only as few elements of the beam guidance as possible remain arranged between the decoupling location of the laser light from the beam guidance and the marking location.

In prior art, this was accomplished in that markings were made in a security document and optically compared to specifications and, correspondingly, in case of deviations, corrections were made to an assignment function.

In the method proposed here and the device 1 proposed here for performing laser markings in a security document 2, the device 1 comprises a measuring head 70, which is able to determine absolutely a laser light output or a laser pulse energy. This means that the measuring head itself is either gauged against an absolute standard or calibrated in a comparable manner against an absolute standard. Technically, such a measuring head 70 measuring absolutely can for example be implemented in the form of a thermopile 71. A thermopile 71 comprises thermocouples 72 electrically arranged in series and thermally arranged in parallel. A side 73 of the thermocouples is thereby subjected to the laser light. Another side 74 of the thermocouples 72 is protected from the radiation and cooled if required. The laser light 40 is absorbed on the one side 73 of the thermocouples 72 and a heat flow along a heat conductor which, for example, can be formed by the thermocouples 72 themselves, is measured and evaluated as a signal. Thus, the deposited laser light output or—energy can be measured accurately and absolutely. The measured laser light output or—energy is supplied to the control device 10 in the form of a calibration signal 75.

To be able to measure the laser light output absolutely, a defined proportion 42 of the laser light 40 must be guided onto or into the measuring head 70. A decoupling unit 80 is intended for this. In the embodiment shown, the decoupling unit 80 comprises a beam splitter 81, which decouples the defined proportion 42 of the laser light 40 from the beam path 41 of the laser light 40 for the marking of the security document 2. In some embodiments, this beam splitter 81 can be permanently arranged in the beam path 41. However, to obtain a measured variable, having a small statistical error, for the laser light output or -energy, a considerable proportion of the laser light 40 must be decoupled. It is therefore preferred that the decoupling unit 80 is designed to move the element used for decoupling, here the beam splitter 81, only during the calibration in the beam path 41. A drive unit 82 is intended for this, which, in the embodiment shown, is able to linearly move the beam splitter. In the position shown, the beam splitter 81 is in the beam path 41, to decouple the defined proportion 42 of the laser light 40 in the measuring head 70. The position of the beam splitter 81' is shown dashed, in which it is not in the beam path 41. In this position, the entire laser light output or -energy is available for marking.

The calibration signal 75 is evaluated in the control device 10 and, using the known proportion factor for the defined proportion 42 of the laser light 40, which is decoupled from the beam path 41 to the beam splitter 81, the laser light output or laser pulse energy available for marking onto the security document 2 is inferred. To this end, known losses at further optical elements such as at a further beam splitter 85 or the deflection mirrors 55, 56 of the position control device 32 can be taken into account. Likewise, systematic deviations of the measuring head or other components can be determined once and also taken into account in the proportion factor. The laser light output or laser pulse energy thus ascertained is then compared to those already-known values of the nominal laser light output or nominal laser pulse energy, which indicate the required output or energy for the respective security document 2, in order to generate a certain brightness value. If a deviation is found above a threshold value, which can be dependent on the brightness value, then the assignment function 18 is correspondingly changed in order to match the actually generated laser light output of the laser light 40 to the specified value for the corresponding brightness value. During such a calibration step, the laser control signal 5 is held constant for a certain brightness value, and only after ascertaining that there is a deviation from the specified value, the assignment function and correspondingly, if required, the laser control signal too are changed. Preferably, the laser light output induced by the change is checked directly afterwards and the calibration steps are performed until, for the corresponding brightness value, the correct laser light output is provided on the part of the laser 3.

During initial commissioning or after a longer stoppage, a calibration is performed preferably for all brightness values which can be requested in the graphic information. In operation, in which security documents are individually marked with graphic information, continuously or at intervals, the calibration is usually only checked between the marking of security documents or only after the marking of a specified number of security documents. In one embodiment, after each document or a number of security documents, only one brightness value is checked with respect to its calibration. This can be performed successively cyclically, i.e. always after marking a further document or a further number of security documents, for the individual brightness values occurring. In another embodiment, the brightness value, which is always checked between the marking of a specified number of security documents, is defined stochastically. This can also detect or eliminate systematically occurring fluctuations.

To be able to react to possible short-term fluctuations, a further beam splitter 85 is additionally intended in some embodiments, said beam splitter being permanently arranged in the beam path and decoupling only a small further proportion 91 of the laser light from the beam path. This further proportion 91 is guided onto a measuring element 92 which measures the laser light output/-energy relatively, which preferably comprises a semiconductor component, especially preferably a photodiode 93. The photodiode provides a control signal 94 which can be used to equalize short-term fluctuations of the laser light output/laser pulse energy for the individual brightness values similar to the laser light calibration. Herein, the control signal values captured immediately after the calibration or at the beginning of a marking of security documents serve as reference values, compared to which deviations are determined. The values of the control signal 94 provided by the photodiode, however, only indicate a relative tendency for the captured laser pulse energy or laser pulse output.

In the version shown, the positioning of the laser light 40 with respect to the security document 2 is accomplished by pivotable deflection mirrors 55, 56 equipped with galvano drives 53, 54. In other embodiments, an optical fibre can be moved relative to the security document 2. For the invention, it is irrelevant how the position control device is designed in detail. Any position control device can be used which is capable of positioning the laser light 40 relative to the security document 2 such that it, temporally synchronised, has a corresponding laser light output or pulse energy, so that the brightness value, associated with the location, is stored according to the graphic information in the security document.

Figure 2:
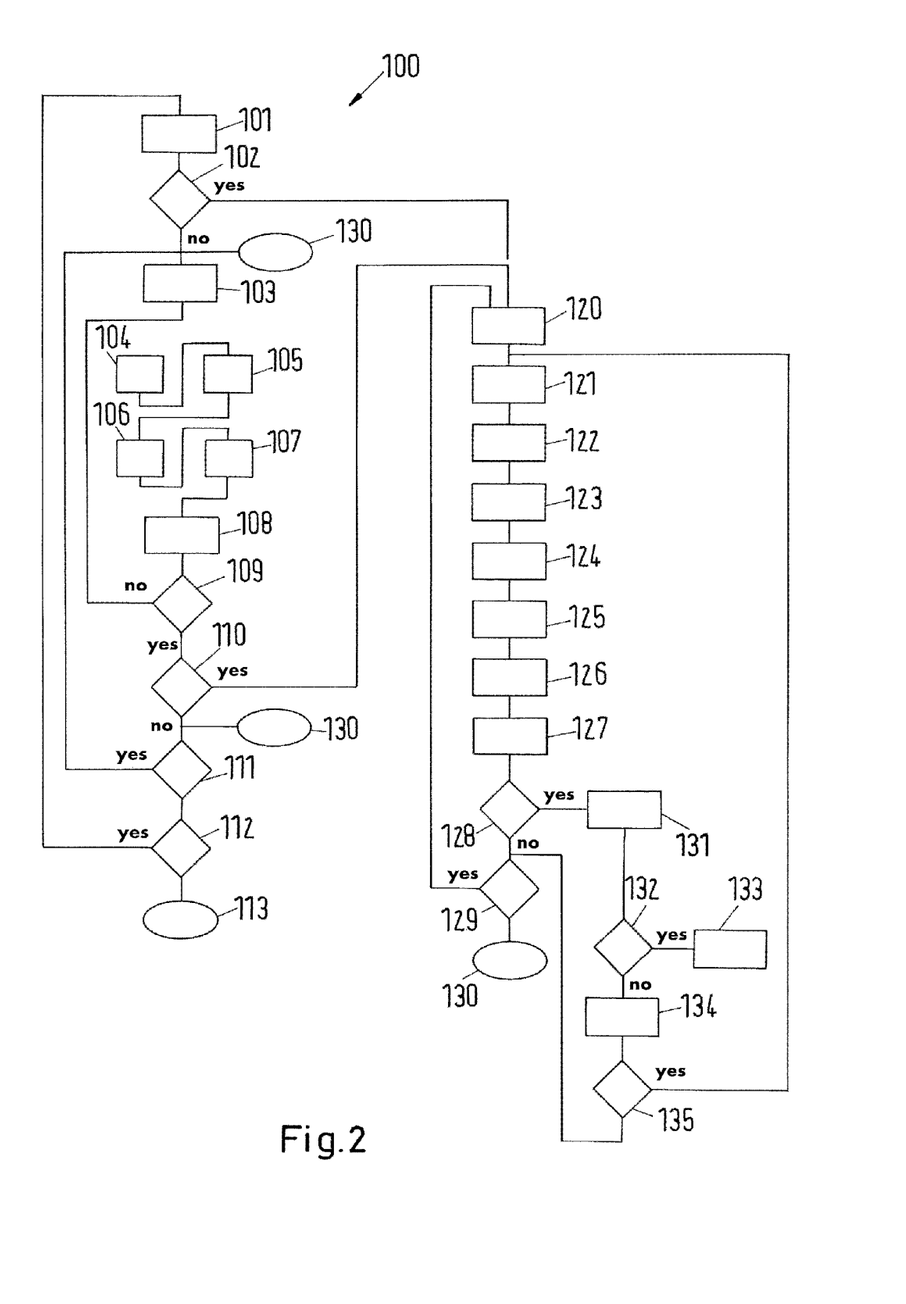
FIG. 2 showing a schematic flow diagram of an embodiment of a method for laser marking.

In FIG. 2, a flow diagram of a method for laser marking is shown schematically. The method for laser marking a security document first comprises, in the embodiment shown, a method step of receiving an assignment function 101 which, for a certain document type, converts the desired brightness values to required laser light outputs or laser pulse energies, i.e. assigns these. This step can be omitted in some embodiments, provided that the assignment function is already firmly programmed into the control device.

In the embodiment shown, a poll 102 checks whether a calibration is to be performed or not. This, for example, is necessary during initial commissioning or after a long stoppage, exchange of the laser etc. See the description further below on how to perform a calibration.

If no calibration is performed or this is completed, then, in a further step, the graphic information is received 103 which comprises the position values and brightness values, which represent a graphic to be marked.

Using the graphic information, a laser control signal 104 is generated relating to a corresponding brightness value using the assignment function. The control value of the laser control signal represents the control value assigned to the corresponding brightness value, said control value being necessary to induce a corresponding laser light output/laser pulse energy for performing the marking with the corresponding brightness.

Appropriately correlated to the laser control signal, a position control signal is generated 105. The laser control signal controls a laser which generates a laser light of the corresponding laser light output or laser pulse energy 106. Correlated thereto, a position control device is controlled and positioned 107 such that the laser light is guided to the correct position on or in the security document, at which position the marking with the corresponding brightness value is to be performed. Correspondingly, a pixel of the graphic information is marked in the security document 108. Then, a check is made whether the graphic is completed 109. If this is not the case, then the method step "Generating a laser control signal" 104 for a new pixel is continued with. If the graphic is completed, a check is made whether a calibration is to be performed 110. To this end, for example, a check can be made whether a specified number of security documents have been marked since performing a previous calibration step. In other embodiments, this poll 110 can be omitted if a calibration step is performed after each security document. If no calibration step is to be performed, a check is made whether a further security document of the same type is to be marked 111. If this is to take place, then the receiving of graphic information 103 is continued with. If no security document of the same type is to be marked, a check is made whether a security document of another type is to be marked 112. In this case, the method continues with receiving a new assignment function 101. Otherwise the marking process ends 113.

If a calibration step is performed, then a brightness value is defined first 120. According to the brightness value, then the laser control signal is generated 121 and laser light of the corresponding laser light output is generated 122. From the beam path for marking the security document, a defined proportion of the laser light is decoupled 123. This, for example, can take place by driving a decoupling mirror or beam splitter into the beam path.

The decoupled laser light is guided onto a measuring head measuring absolutely, and it is used to measure the laser light output or laser pulse energy absolutely 124. The measurement result is provided in the form of a calibration signal 125. The calibration signal is then evaluated in order to infer, using the known decoupled proportion, the actually available laser light output 126 which is available at the security document for marking. To this end, further laser light output losses at further optical components in the beam path can be taken into account.

The laser light output, thus ascertained and available for the marking, is compared to a specified value for the corresponding brightness value 127. Then a check is made whether the actually ascertained and available laser light output deviates from the specified value, i.e. the nominal laser light output or nominal laser pulse energy, by more than a tolerance threshold 128. If this is not the case, a check is made in a subsequent step 129 whether the calibration is to be performed for a further brightness value. If the calibration is to be performed for a further brightness value, then the method step "Defining the brightness value/selecting the brightness value" 120 is continued with. Otherwise the calibration is terminated 130. In this case, the continuation takes place at the corresponding position of the marking process, at which the branching in the calibration step took place.

If the deviation of the ascertained and available laser light output from the specified nominal laser light output or the ascertained and available laser pulse energy from of the nominal laser pulse energy is greater than a specified threshold value, then the assignment function is adapted 131. To this end, for example, a check is made whether the ascertained and available laser light output is lower than the specified value 132. In this case, the assignment function is changed such that the control value, which is assigned to the brightness value, is increased 133. Otherwise, the control value, which is assigned to the brightness value, is lowered 134 since, inevitably, the laser light output/laser pulse energy ascertained is greater than the specified value (nominal value). Then a check is made whether the change of the assignment functions is to be checked in a further calibration step 135. If this is the case, then the method step "Generating a laser control signal" 121 is continued with. Otherwise, the poll 129 of whether a further calibration step is to be performed for another brightness value, is continued with.

In the method, shown above, for laser marking, preferably after each receipt of a new assignment function 101, a calibration for all possible brightness values is performed, as indicated in the method steps 120 to 135. Such a calibration is also performed during first commissioning or after longer stoppages.

It is understood by the person skilled in the art that only exemplary embodiments of the invention have been described.

LIST OF REFERENCE SYMBOLS 1 device for laser marking
2 security document
3 laser
4 control input
5 laser control signal
6 control line
10 control device
11 microprocessor
12 memory unit
13 program code
15 interface
16 graphic information
18 assignment function
21 laser marking
31 position control signal
32 position control device
33 beam guiding optics
34 two-axis deflection device
40 laser light
41 beam path for the marking
42 defined proportion of the laser light
51, 52 axes
53, 54 galvano drives
55, 56 deflection mirrors
60 receptacle
70 measuring head
71 thermopile
72 thermocouples
73 one side
74 other side
75 calibration signal
80 decoupling unit
81, 81' beam splitter
82 drive unit
85 further beam splitter
90 relative measuring device
91 further proportion
92 measuring element
93 photodiode
94 control signal
100 method
101-113 method steps
120-135 method steps (calibration)

The invention claimed is:

1. A method for laser marking security documents comprising the following steps:
 a) capturing graphic information which describes a graphic having different brightness values;
 b) generating a position control signal and a laser control signal dependent on the graphic information, wherein each brightness value is assigned a nominal laser light output or nominal laser pulse energy which is needed to induce a laser marking with the corresponding brightness value in a security document and, wherein the laser control signal is generated by means of an assignment function, wherein each brightness value is assigned a control value which is provided for generating laser light with the corresponding laser light output according to the nominal laser light output or laser pulse energy according to the nominal laser pulse energy, c) controlling a laser by means of the laser control signal and emitting laser light with a laser light output or laserpulse energy according to the laser control signal; and d) temporally adapted controlling of at least one position control device by means of the position control signal, so that the emitted laser light is positioned relative to the security document, so that, by iteratively performing the method steps b) to d), a correctly positioned marking of the security document with the graphic having the different brightness values is performed, characterized in that at least one calibration step is performed, wherein, when performing the calibration step, the laser control signal with a control value for a brightness value is generated and held constant during the calibration step, wherein a defined proportion of the laser light is decoupled from a beam path for the laser marking and is guided into a measuring head, the measuring head measuring absolutely, the decoupled proportion of the laser light output, or energy thereof, that is, guided onto the measuring head, and wherein a calibration signal is generated, and, wherein from the measured output or energy of the decoupled proportion of the laser light represented by the calibration signal, the output or pulse energy available for the marking is ascertained, and wherein (i) the output ascertained is compared to the nominal laser light output or (ii) the pulse energy ascertained is compared to the nominal laser pulse energy, and wherein the calibration is performed by a change of the assignment function if, in the comparison, a difference above a specified tolerance threshold is ascertained.

2. The method according to claim 1, characterized in that the output or energy of the laser light is measured by means of a measuring head comprising a thermopile.

3. The method according to claim 2, characterized in that a calibration step for the same brightness value is directly repeated if an adaptation of the assignment function took place.

4. The method according to claim 1, characterized in that, after each marking of a security document or a predefined number of security documents, a calibration step for a brightness value is performed.

5. The method according to claim 4, characterized in that, successively, calibration steps for different brightness values are performed provided that no adaptation of the assignment function is necessary.

6. The method according to claim 5, characterized in that the laser light is provided as pulsed laser light and, during the calibration step, an averaging is performed over several laser pulses.

7. The method according to claim 5, characterized in that a further defined proportion of the laser light is decoupled on a relative output/energy measuring device which captures a pulse output or pulse energy of the individual pulses relative to previously captured pulse outputs or pulse energies, and the relative measured pulse output or pulse energy is used to perform a regulation of the laser control signal to equalize output fluctuations or pulse energy fluctuations.

8. The method according to claim 4, characterized in that a calibration step for the same brightness value is directly repeated if an adaptation of the assignment function took place.

9. The method according to claim 4, characterized in that a further defined proportion of the laser light is decoupled on a relative output/energy measuring device which captures a pulse output or pulse energy of the individual pulses relative to previously captured pulse outputs or pulse energies, and the relative measured pulse output or pulse energy is used to perform a regulation of the laser control signal to equalize output fluctuations or pulse energy fluctuations.

10. The method according to claim 1, characterized in that a calibration step for the same brightness value is directly repeated if an adaptation of the assignment function took place.

11. The method according to claim 10, characterized in that, successively, calibration steps for different brightness values are performed provided that no adaptation of the assignment function is necessary.

12. The method according to claim 10, characterized in that the laser light is provided as pulsed laser light and, during the calibration step, an averaging is performed over several laser pulses.

13. The method according to claim 10, characterized in that a further defined proportion of the laser light is decoupled on a relative output/energy measuring device which captures a pulse output or pulse energy of the individual pulses relative to previously captured pulse outputs or pulse energies, and the relative measured pulse output or pulse energy is used to perform a regulation of the laser control signal to equalize output fluctuations or pulse energy fluctuations.

14. The method according to claim 1, characterized in that the laser light is provided as pulsed laser light and, during the calibration step, an averaging is performed over several laser pulses.

15. The method according to claim 14, characterized in that a further defined proportion of the laser light is decoupled on a relative output/energy measuring device which captures a pulse output or pulse energy of the individual pulses relative to previously captured pulse outputs or pulse energies, and the relative measured pulse output or pulse energy is used to perform a regulation of the laser control signal to equalize output fluctuations or pulse energy fluctuations.

16. The method according to claim 1, characterized in that a further defined proportion of the laser light is decoupled on a relative output/energy measuring device which captures a pulse output or pulse energy of the individual pulses relative to previously captured pulse outputs or pulse energies, and the relative measured pulse output or pulse energy is used to perform a regulation of the laser control signal to equalize output fluctuations or pulse energy fluctuations.

17. The device for laser marking security documents comprising a) a control device with an interface for capturing graphic information which describes a graphic having different brightness values;

b) wherein the control device is designed to generate a position control signal and a laser control signal dependent on the graphic information (16); wherein each brightness value is assigned a nominal laser light output or nominal laser pulse which is needed to induce a laser marking with the corresponding brightness value in a security document and, wherein by means of an assignment function, each brightness value is assigned a control value which is provided for generating laser light with the corresponding laser light output or laser pulse energy, c) a laser, wherein the laser light output of the laser is controlled by means of the laser control signal, and wherein the laser emits laser light with a laser light output or laser pulse energy according to the laser control signal; and d) a beam guiding optics for guiding the laser light emitted by the laser onto the security document and e) at least one positioning control device controllable by means of the position control signal for positioning the laser light temporally adapted to the laser light output or laser pulse energy, defined by means of the laser control signal, relative to the security document, so that a correctly positioned marking of the security document with the graphic having the different brightness values can be performed, characterized in that the device comprises a measuring head measuring absolutely, and a decoupling unit for decoupling a defined proportion of the laser light from a beam path for the laser marking and guiding of the decoupled proportion onto the measuring head, wherein the measuring head is designed to measure absolutely an output or energy of the decoupled proportion of the laser light guided onto the measuring head and to output a calibration signal representing the absolutely measured light output or deposited energy to the control device, wherein the control device is designed to perform, during operation of the device, at least one calibration step in which the laser control signal for a brightness value is generated and held constant during the calibration step, to ascertain, from the measured output or energy of the decoupled defined proportion of the laser light represented by the calibration signal, the output or energy available for marking and to compare (i) the output ascertained to the nominal laser light output or (ii) the pulse energy ascertained to the nominal laser pulse energy, and wherein the calibration is performed by a change of the assignment function if, in the comparison, a difference above a specified tolerance threshold is ascertained.

18. The device according to claim 17, characterized in that the measuring head comprises a thermopile.

19. The device according to claim 18, characterized in that the decoupling unit comprises a decoupling element which can be moved into the beam path.

20. The device according to claim 17, characterized in that the decoupling unit comprises a decoupling element which can be moved into the beam path.

* * * * *

UNITED STATES PATENT AND TRADEMARK OFFICE
CERTIFICATE OF CORRECTION

| | | |
|---|---|---|
| PATENT NO. | : 9,539,840 B2 | Page 1 of 1 |
| APPLICATION NO. | : 14/786486 | |
| DATED | : January 10, 2017 | |
| INVENTOR(S) | : Werner Richter | |

It is certified that error appears in the above-identified patent and that said Letters Patent is hereby corrected as shown below:

In the Claims

In Claim 17, Column 14, Line 57, "The device for laser marking security documents" should read:
-- A device for laser marking security documents --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*